United States Patent [19]

Wienecke

[11] 3,836,208
[45] Sept. 17, 1974

[54] ANTISKID CONTROL SYSTEM

[75] Inventor: Franz Wienecke, Oberstedten, Taunvs, Germany

[73] Assignee: ITT Industries, Inc., New York, N.Y.

[22] Filed: Oct. 25, 1972

[21] Appl. No.: 300,620

[30] Foreign Application Priority Data
Nov. 12, 1971 Germany............................ 2156307

[52] U.S. Cl......... 303/21 F, 188/181 A, 303/21 AF
[51] Int. Cl............................................. B60t 8/12
[58] Field of Search.................... 303/21 AF, 61–63, 303/68–69, 10–11; 188/181

[56] References Cited
UNITED STATES PATENTS

| 3,532,391 | 10/1970 | Klein | 303/21 F |
| 3,667,811 | 6/1972 | Okamoto et al. | 188/181 A X |
| 3,677,608 | 7/1972 | Lewis | 188/181 A X |
| 3,682,513 | 8/1972 | Oberthür | 303/21 F |
| 3,682,514 | 8/1972 | Oberthür | 303/21 F |
| 3,708,213 | 1/1973 | Skoyles | 303/21 F |

Primary Examiner—Trygve M. Blix
Assistant Examiner—D. C. Butler
Attorney, Agent, or Firm—John T. O'Halloran; Menotti J. Lombardi, Jr.; Alfred C. Hill

[57] ABSTRACT

This invention relates to a hydraulic arrangement for an antiskid system employed in a two circuit brake system where each of the two brake circuits control the wheels of a single axle. The hydraulic arrangement includes a plunger unit having a spring-like actuated control element in one of the two brake circuits and a purely hydraulically controlled plunger unit in the other of the two brake circuits. The control chambers of the two plunger units are hydraulically connected in series so that the plunger units operate together particularly in an antiskid control cycle. The arrangement is light-weight, space and cost saving and safe with regards to its antiskid operation while the sense and purpose of the two-circuit braked axle is completely maintained.

7 Claims, 1 Drawing Figure

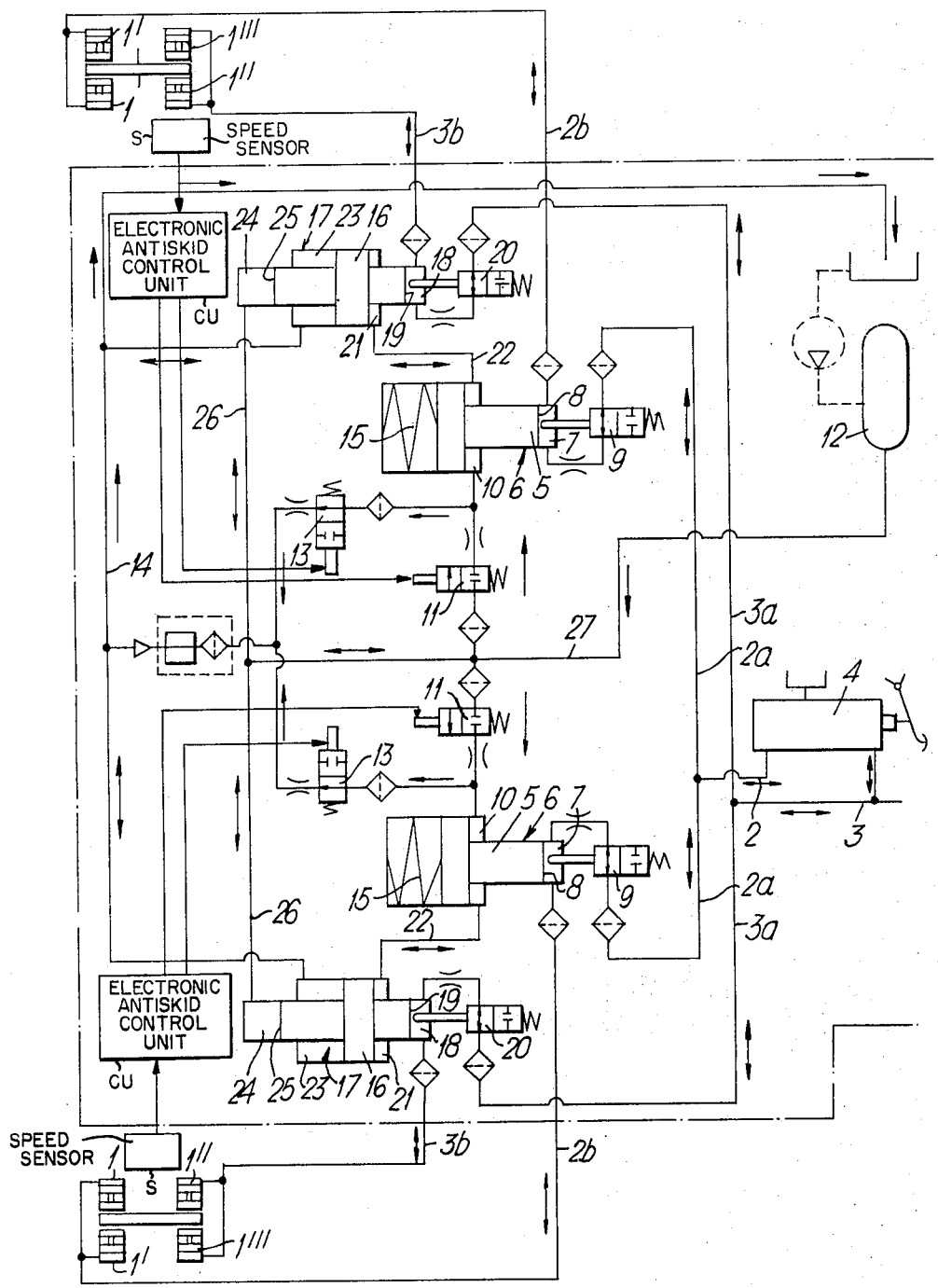

ANTISKID CONTROL SYSTEM

BACKGROUND OF THE INVENTION

The invention relates to an antiskid control system for motor vehicles in which dependent on a control value determined by a wheel rotation sensor the brake circuit is actuated in a manner known per se by means of plungers such that the braked wheel does not lock.

In different known embodiments of an antiskid control system based on this principle the movement of a piston generating the volume expansion is mechanically coupled with that of a separating valve. The piston is moved by controlled pressure which acts on a diaphragm connected with the piston against the high pre-stress force of a spring supporting itself on the diaphragm, on the one hand, and on the housing bottom, on the other hand, said spring also applying the return force for the piston in its normal position.

The assembly of such strongly prestressed springs — in the described case the spring must have a prestress force which exceeds the force of the brake pressure acting on the piston front surface — is particularly disadvantageous if an all-wheel control is desired and consequently an above mentioned piston unit is provided for each vehicle wheel, i.e., four times in a one circuit brake system and in a two-circuit brake system with a two-circuit braked front axle six times. These piston units and especially the spring-cup units mounted at these pistons are expensive, heavy, difficult to assemble, and require very much precious structural space.

Therefore, it has been suggested to control the plunger hydrodynamically in both directions, e.g., by switching on and off an accumulator pressure on both sides of the plunger. But even then for safety reasons an emergency and return spring or another additional safety device cannot be dispensed with since the brake system has to be kept operative even upon a break-down of the accumulator pressure.

In an arrangement according to the German published Pat. application No. 1,940,248 the control pressure applied on the actuating surface of the plunger is controlled by electromagnetically actuated valves which serve as input and output valves for the accumulator pressure. Upon a breakdown of the accumulator pressure a locking device which is also dependent on the accumulator pressure and actuated in opposite direction by a servo-force keeps the output valve closed, while the input is secured by a return valve. The effect of the control device is neutralized upon a break-down of the accumulator pressure, but the brake system as such is still ready for operation. This locking device must, however, be provided for each output valve provided in the system.

The French Pat. Specification No. 2,030,813 describes a system in which the part of the brake line of one wheel to be separated hydraulically from the master cylinder by a separating valve is connected with a cylinder in which a plunger moves which in its normal position keeps the separating valve lifted off from its seat via a projection. A second cylinder chamber is separated from this first cylinder chamber by a partition wall and a piston arranged in the second cylinder chamber is controlled by an emergency and return spring supporting itself on the bottom of the housing. A projection of this piston projects sealingly guided through the partition wall into the first cylinder chamber. The second cylinder chamber is connected to a pump or an accumulator, respectively, such that the piston is kept down against the force of the emergency and return spring by means of the hydraulic pressure applied on the pistons annular surface. The part of the first cylinder chamber separated from the brake circuit by the plunger is connected alternatively, dependent on the control value describing the state of motion of the wheel in the normal case, to the accumulator or during a control action to the reservoir via a return line. In the normal case the surface of the plunger opposite the brake circuit is applied with accumulator pressure, the plunger is kept in its normal position and the separating valve is kept lifted off from its seat so that pressure can be built up in the wheel brake cylinder from the master cylinder. If there is the danger that the wheel locks after an initiated brake action, an actuating signal is generated dependent on the changing control value, said actuating signal separating the part of the first cylinder chamber from the accumulator and connecting it with the reservoir. The brake pressure acting on the surface of the plunger facing the brake circuit moves the piston into the cylinder, and, in doing this, also closes the separating valve. The volume of the part of the brake circuit connected with the wheel brake cylinder expands by the movement of the plunger proportional to the existing brake pressure and the pressure medium can expand. The wheel having regained a certain speed the cylinder chamber is again connected to the accumulator and the normal state is reestablished.

During the whole operation described above the piston arranged in the second cylinder chamber remains in its prestressed position against the emergency and return spring. Only when a break-down of the accumulator pressure occurs does the emergency and return spring push this piston upwards so that its projection projecting into the first cylinder chamber abuts the bottom of the plunger and keeps it in its normal position in each case, even against the brake pressure, and keeps the separating valve lifted off from its seat. In this system the antiskid brake control system fails upon a break-down of the accumulator pressure, but the brake circuit itself is kept operative. As can be seen, however, even in this system a strong return spring in each of the plunger units can not be dispensed with. This return spring, too, which only acts in case of emergency must be able to overcome the force of the brake pressure on the plunger.

In an all-wheel controlled vehicle the arrangement of four or six strong return springs at the four or six plunger units causes difficulties because of the big space demand, the weight and the high costs.

SUMMARY OF THE INVENTION

An object of the present invention is to provide an antiskid control system which is particularly suitable for two-circuit brake systems and in two-circuit brake systems with a two-circuit braked front axle and which can dispense with a plurality of return springs in the whole system even with independent control at all wheels.

Another object of the present invention is to provide an antiskid control system that is lightweighted, space-saving, safe, and having low cost.

A feature of the present invention is the provision of an antiskid control system for a motor vehicle in which a control value determined by a wheel rotation sensor actuates a brake circuit having at least one plunger unit such that the braked wheel does not lock comprising: a first plunger unit having a spring-like actuated control element and a first control chamber; and a second hydraulically controlled plunger unit having a second control chamber; the first and second control chambers being directly connected in series.

Another feature of the present invention is the provision of an antiskid control system for a motor vehicle having two brake circuits in which a control value determined by a wheel rotation sensor actuates the brake circuits each having at least one plunger unit such that the braked wheel does not lock comprising: a first plunger unit having a spring-like actuated control element and a first control chamber disposed in one of the brake circuits; and a second hydraulically controlled plunger unit having a second control chamber disposed in the other of the brake circuits; the first and second control chambers being directly connected in series.

According to the present invention the objects are achieved by a spring-loaded plunger unit in the pressure medium connection of one brake circuit which is hydraulically controllable in the direction of the movement to the volume expansion of the part connected with the wheel brake cylinders and that in the pressure medium line of the other brake circuit a pressure medium loaded plunger unit is provided which is hydraulically controllable in both directions of the movement, that the annular chambers of both plunger units which receive the control pressure in direction of the volume expansion of the parts of the pressure medium lines connected with the wheel brake cylinders are interconnected and that the spring-load plunger unit is connectable alternately to a pressure medium accumulator and a return line via an input valve closed in rest position and via an output valve opened in rest position.

The actuating surface of the purely hydraulically controlled plunger unit opposite from the pressure medium line defines a chamber in a cylinder thereof, said chamber being constantly connected with the pressure accumulator.

The actuating surface of the purely hydraulically controllable plunger defining the chamber connected with the pressure accumulator is smaller than the annular surface defining the annular chamber for the reception of the control pressure.

In the case of two-circuit braked wheels of a vehicle axle a combination of a spring-loaded plunger unit in one brake circuit and a purely hydraulically controlled plunger unit in the other brake circuit is provided for each wheel.

One or more spring-loaded plunger units and one more purely hydraulically controlled plunger units can be integrated into one compact aggregate.

A combined arrangement of spring-loaded plunger units and purely hydraulically controlled plunger units in the pressure medium lines of two brake circuits to the wheel brake cylinders of a two-circuit braked axle can be combined with any antiskid control system for the wheels of the second axle.

BRIEF DESCRIPTION OF THE DRAWING

The above-mentioned and other features and objects of this invention and the manner of obtaining them will become more apparent by reference to the following description taken in conjunction with the drawing, the single FIGURE of which is a schematic illustration of an antiskid control system in accordance with the principles of the present invention.

DESCRIPTION OF THE PREFERRED EMBODIMENT

The FIGURE shows an embodiment of the inventive antiskid control system, for purposes of explanation, in connection with a two-circuit braked front axle of a motor vehicle. Four brake cylinders 1, 1', 1'', 1''' are located with their linings in the brake calipers of the two front wheels, each of the two cylinders 1 and 1', 1'' and 1''' which face each other being connected to one of the two brake circuits. The brakes of the rear wheels may be actuated via one of these two brake circuits. This serves the purpose to decelerate the wheels of this axle at least via the brake circuit which is still intact upon a break-down of one of the brake circuits, a fact which, as can be easily seen, offers advantages with respect to safety and efficiency as compared to the normal two-circuit brake systems in which the one brake circuit acts on the wheels of the front axle, while the other brake circuit acts on the wheels of the rear axle. The inventive antiskid control system is inserted in the pressure medium lines 2a, 2b and 3a, 3b between the master cylinder 4 and wheel cylinders 1, 1', 1'', 1'''. Pressure medium line 3 furthermore branches off at master cylinder 4 to the wheel brakes of the second axle.

A spring-loaded hydro-statically controlled plunger unit which is represented only schematically in the drawing is inserted in the pressure medium line 2a, 2b. The plunger 5 designed as stepped piston is arranged displaceably in a correspondingly stepped cylinder 6 and sealed against its interior wall. The chamber 7, which is situated in cylinder 6 before the actuating surface of the plunger 5 having the smaller diameter is also integrated or connected into pressure medium line 2a, 2b. Before the pressure medium passes from the part 2a of the pressure medium line into the chamber 7 it passes through a separating valve 9 which in the represented example is opened and kept open mechanically against a locking force by plunger 5. A hydraulically actuable valve would also be possible. The part 2b of the pressure medium line directly connects chamber 7 with wheel brake cylinders 1,1'. The annular chamber 10 generated by the step of plunger 5 and cylinder 6 is connected, on the one hand, via a preferably electromagnetically actuable input valve 11, closed in rest position, with a pressure accumulator 12 and, on the other hand, via a preferably electromagnetically actuable output valve 13, opened in rest position, with the return line 14. A strongly prestressed return spring 15 supports itself on the bottom of plunger 5.

A purely hydraulically controlled plunger unit — which is illustrated only schematically in the drawing — is inserted in pressure medium line 3a, 3b. The plunger 16 is stepped preferably in the same manner on both sides of a central part and is arranged displaceably in a cylinder 17, which has the corresponding steps, and is arranged in a sealed manner against the interior cylinder wall. Plunger 16 thus separates cylinder 17 into four chambers sealed against each other. The chamber 18 lying before the actuating surface 19 of plunger 16 in the narrowed part of cylinder 17 is also integrated or connected into pressure medium line 3a, 3b. Before the pressure medium passes from the part 3a of the pressure medium line connected with master cylinder 4 into chamber 18 it passes a normally opened separating valve 20, which — in the represented example — is opened and kept open by plunger 16 in its normal position. If needed, here, too, a hydraulically actuated valve can be used. Part 3b of the pressure medium line connects chamber 18 directly with wheel brake cylinders 1'' and 1'''. The next annular chamber 21 formed in longitudinal direction of the plunger 16 by the first step in plunger 16 and in cylinder 17 is connected via a pressure medium line 22 with the annular chamber 10 of the spring-loaded plunger unit connected in the pressure medium line 2a, 2b of the first brake circuit and consequently it is also connected via this annular chamber 10 and input valve 11, closed in rest position, with pressure accumulator 12. The next annular chamber 23 formed by the second step in plunger 16 and in cylinder 17 is connected with return line 14. The chamber 24 which is limited or defined by the actuating surface 25 in the other narrowed part of cylinder 17 is connected via a pressure medium line 26 with pressure line 27 coming from pressure accumulator 12.

The device for the other wheel is also designed in the above mentioned manner and is provided with the corresponding pressure medium lines.

In the normal position of the system brake circuit 2, on the other hand, has a pressure medium passage from master cylinder 4 through part 2a of the pressure medium line, the opened separating valve 9, chamber 7 of the spring-loaded plunger unit and part 2b of the pressure medium line to wheel brake cylinders 1 and 1' and brake circuit 3, on the other hand, has a pressure medium passage from master cylinder 4 through part 3a of the pressure medium line, the opened separating valve 20, chamber 18 of the hydraulically controlled plunger unit and part 3b of the pressure medium line to wheel brake cylinders 1'' and 1''' of the same wheel brake. The driver can build up pressure in the four wheel brake cylinders of the four-cylinder spot-type disc brake via the brake pedal and brake the wheel or the vehicle, respectively. A sensor S detecting the present deceleration of the wheel is arranged at each wheel, when the deceleration of the wheel exceeds a certain value so that the wheel tends to lock, an actuating signal is emitted by a control unit CU controlled by the measured value, said actuating signals bringing electromagnetic input valve 11 and electromagnetic output valve 13 into their switched position. Thus, pressure medium flows from pressure accumulator 12 through pressure line 27 and the now opened input valve 11 into annular chamber 10 of the spring-loaded plunger unit and through pressure medium line 22 also into annular chamber 21 of the hydraulically controlled plunger unit and actuates the respective annular surfaces of plungers 5 and 16 with accumulator pressure. The spring-loaded plunger 5 consequently moves against the force of spring 15, separating valve 9 closes and separates the two parts 2a, 2b of the pressure medium line from each other. As a consequence of the pressure built up in annular chamber 21 by pressure medium line 22 hydraulically controlled plunger 16 moves against the accumulator pressure in chamber 24 acting on actuating surface 25, since the annular surface of plunger 16 is bigger in annular chamber 21 than actuating surface 25, the pressure medium in the chamber 24 is displaced through pressure medium lines 26, 27 and the pressure medium in second annular chamber 23 escapes into return line 14. Separating valve 20 then will also adopt its closed switched position and separates the two parts 3a, 3b of the pressure medium line from each other. The two chambers 7 and 18 lying before actuating surfaces 8 and 19 of the two plungers 5 and 16 increase in volume by the movement of said two plungers; the volume of the parts 2b, 3b of the pressure medium lines connected with wheel brake cylinders 1, 1' and 1'', 1''' increases and the pressure medium can expand so that the deceleration of the wheel decreases and passes over into an acceleration. The wheel having regained a certain rotative speed in relation to the translational speed of the vehicle so that there is no danger of locking a new actuating signal is generated after the sensor S and the control unit CU attached thereto have determined this, said actuating signal causing electromagnetic input valve 11 and electromagnetic output valve 13 to return to their rest position.

Annular chamber 10 of the spring-loaded plunger unit and annular chamber 21 of the purely hydraulically controlled plunger unit which are interconnected by the pressure medium line 22 are separated from pressure accumulator 12 by input valve 11 closing, and are possibly connected to return line 14 via a throttle when output valve 13 opens, so that the pressure medium from annular chambers 10 and 21 can expand. Plungers 5 and 16 are returned into their initial position by strong return spring 15, on the one hand, and by the accumulator pressure acting constantly on actuating surface 25 of the hydraulically controlled plunger 16, on the other hand. Thus, the pressure in the parts 2b, 3b of the pressure medium line connected with wheel brake cylinders 1, 1' and 1'', 1''' again can increase when separating valves 9 and 20 are reopened so that the normal pressure medium connection between wheel brake cylinders 1, 1', 1'', 1''' and master cylinder 4 is reestablished and a new braking and a new antiskid control cycle can begin.

Upon a break-down of the accumulator pressure in the above described system chamber 24 of the hydraulically controlled plunger unit is without pressure and upon a beginning of braking the brake pressure acting on actuating surface 19 of plunger 16 displaces said plunger and separating valve 20 closes so that no pressure can be built up via the pressure medium line 3a, 3b in the wheel brake cylinders 1'', 1''', but the second brake circuit acting on the wheels of this axle remains applicable since plunger 5 is kept in its initial position in pressure medium line 2a, 2b by spring 15.

The sense and the purpose of the two-circuit braked axle, thus, is completely maintained by the inventive device, i.e., brake the wheels of the respective axle via the remaining brake circuit upon a break-down of one brake circuit. The invention guarantees a reduction of the pressure in the parts 2b, 3b of both brake circuits connected with the wheel brake cylinders upon an excessive braking of a two-circuit braked wheel and a neutralization of the braking effect of the wheel while maintaining the two-circuit function since purely hydraulically controlled plunger 16 is carried along by spring-loaded plunger 5. In an arrangement of two completely independent plunger units it could happen, however, that their reaction is not the same as a consequence of measuring and manufacturing tolerances and that the one pair of brake pads is still applied while the other pair is already released from the frictional surface. The system which can advantageously be integrated into one compact unit requires less structural space than two conventional plungers units at each two-circuit braked wheel. Input and output valves for the control pressure are provided only once per wheel.

According to the present prior art the inventive system will be preferably provided for the front axle of a vehicle and it can be combined with any brake and antiskid system at the rear wheels. Of course, it is possible to provide a two-circuit braked rear axle and to equip it with the inventive system. If only one brake circuit acts on the wheels of the rear axle, it is possible to provide one spring-loaded plunger unit per wheel or a common plunger unit for both wheels in order to save costs and structural space. Input and output valves for each wheel switchable dependent on its state of motion can be inserted in the brake circuit of the rear axle in order to reach the neutralization of the braking effect by extracting a certain quantity of brake fluid, said quantity being retransported into the brake circuit by a pump.

According to the invention it is also possible in principle to provide spring-loaded plungers for the brake circuit of the front axle and hydraulically controlled devices for the other brake circuit of the front and rear axle.

All parts to be provided for the antiskid control in a vehicle can be integrated advantageously into one device, the safety with respect to leakages thus being increased since important pressure medium connections can be established by connecting bores in the housing and not by pressure medium hoses and connections.

If the inventive system is used in a two-circuit brake system in which one brake circuit only acts on the wheels of one axle, the control of all wheels is not completely independent but a pair of wheels is always influenced possibly in a diagonal relationship, dependent on the state of motion of one wheel or both wheels because, as explained above, the purely hydraulically controlled plunger is carried along by the spring-loaded plunger and on the other hand the two-circuit function with its safety effect is maintained completely while costs and structural space are saved.

Of course, the application of the invention is also possible in a one-circuit brake system, in order, for instance, to safeguard a synchronous control of at least two wheels or to eliminate skidding.

While I have described above the principles of my invention in connection with specific apparatus it is to be clearly understood that this description is made only by way of example and not as a limitation to the scope of my invention as set forth in the objects thereof and in the accompanying claims.

I claim:

1. An antiskid control system for a motor vehicle having two brake circuits in which a control value determined by a wheel rotation sensor actuates said brake circuits each having at least one plunger unit such that the braked wheel does not lock comprising:

a first plunger unit having a spring-like actuated control element and a first control chamber disposed in one of said brake circuits;

a second hydraulically controlled plunger unit having a second control chamber disposed in the other of said brake circuits;

said first and second control chambers being directly connected in series;

a master cylinder;

a separating valve coupled between said master cylinder and said first plunger unit;

first wheel brake cylinders coupled to said first plunger unit;

the brake medium of said first wheel brake cylinders being released by volume expansion upon controlled movement in one direction of a first plunger disposed in said first plunger unit defining said first control chamber;

second wheel brake cylinders coupled to said second plunger unit;

the brake medium of said second wheel brake cylinders being controlled by controlled movement in both directions of a second plunger disposed in said second plunger unit defining said second control chamber;

a pressure medium accumulator;

a return line;

an input valve closed in rest position and controlled by said control value disposed between said first chamber and said accumulator; and an output valve open in rest position and controlled by said control value disposed between said first chamber and said return line.

2. A system according to claim 1, wherein said two brake circuits are connected to each wheel of one axle of said motor vehicle.

3. A system according to claim 1, wherein two sets of said first and second plunger units are provided, one set of said first and second plunger units being provided for one wheel of one axle of said motor vehicle and the other set of said first and second plunger units being provided for the other wheel of said one axle of said motor vehicle.

4. A system according to claim 1, further including a third control chamber disposed in said second plunger unit defined by said second plunger opposite to said second control chamber constantly directly connected to said accumulator.

5. A system according to claim 4, wherein the actuating surface of said second plunger defining said third control chamber is smaller than the annular surface of said second plunger defining said second control chamber.

6. A system according to claim 5, wherein said two brake circuits are connected to each wheel of one axle of said motor vehicle.

7. A system according to claim 5, wherein two sets of said first and second plunger units are provided, one set of said first and second plunger units being provided for one wheel of one axle of said motor vehicle and the other set of said first and second plunger units being provided for the other wheel of said one axle of said motor vehicle.

* * * * *